May 12, 1931.  E. GOLDBERG ET AL  1,804,500
FILM BOX
Filed Dec. 1, 1927
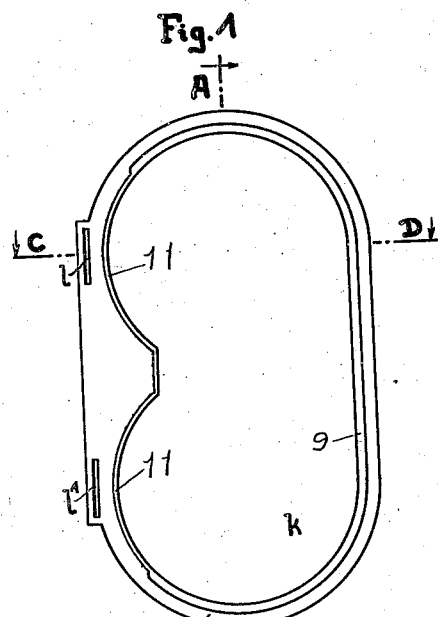
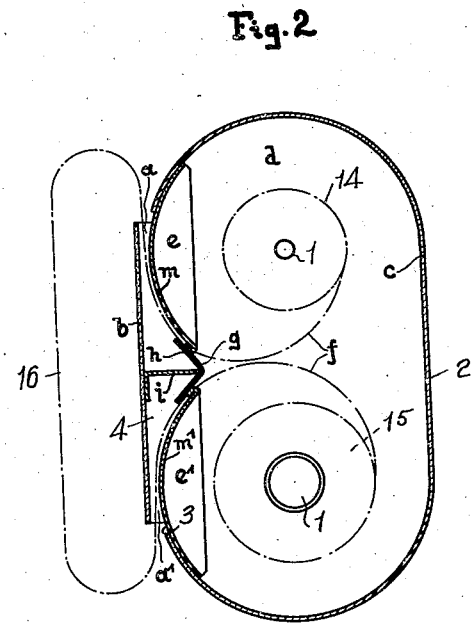
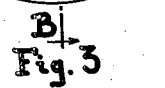
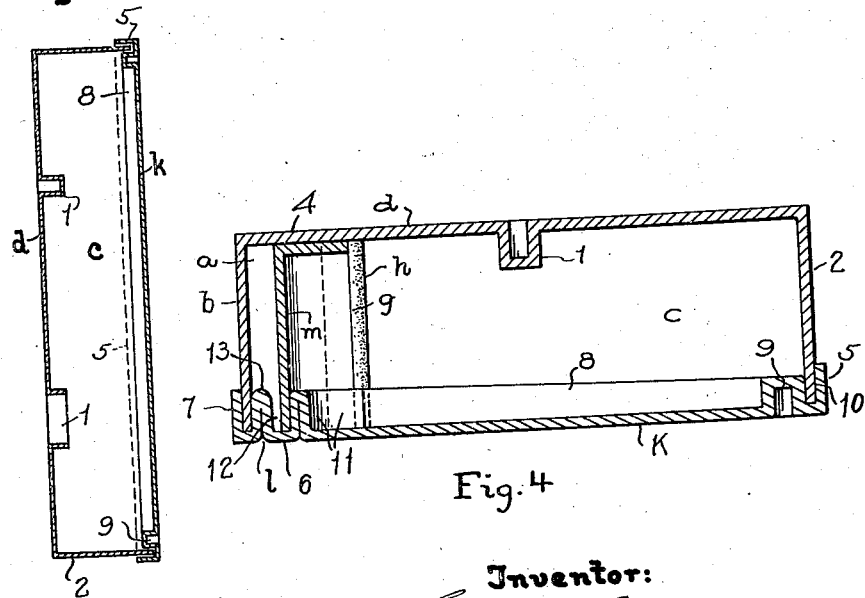
Inventor:
Emanuel Goldberg
Otto Fischer
By William C. Linton Attorney.

Patented May 12, 1931

1,804,500

UNITED STATES PATENT OFFICE

EMANUEL GOLDBERG AND OTTO FISCHER, OF DRESDEN, GERMANY

FILM BOX

Application filed December 1, 1927, Serial No. 237,085, and in Germany April 21, 1927.

The present invention relates to film holders or magazines for moving picture cameras and more particularly to the so-called "daylight casings" or "dark slides" wherein the films manufactured by a producer are packed in light-tight magazines and sold to the owners of cameras whereby the cameras may be loaded in the daylight without injury or exposure of the films and when such films have been run through the camera or exposed, the magazines containing the exposed films may be returned to the producer or others for the purpose of having the same developed. In this class of film boxes or magazines, a portion of the film strip extends exteriorly of the box in a manner that the operator may readily grasp the strip exposed or extended end portion of the strip for threading the same through the film feeding mechansim of the camera. The exposed portion of the film extends through suitable passageways arranged within the magazine and it is the purpose of the present invetnion to provide casings or magazines of this character wherein such film passageways will be fully protected against the penetration of light within the casing and consequently, protecting the exposure of the film during transportation or handling of the same.

Another and equally important object of the invention is the provision of light-proof passageways for casings or magazines of this character through which a smooth unwinding and re-winding of the film may be effected and one which will be comparatively inexpensive in the cost of manufacture thereby rendering the same commercially desirable.

With the above and other objects in view the invention consists of certain novel features of construction, combination and arrangements of parts as will be hereinafter more fully described and particularly pointed out in the accompanying drawings, in which Figure 1 is a side elevation of the film box embodying the present invention;

Figure 2 is a vertical section through the casing showing by dotted lines the position of the film strip within the casing;

Figure 3 is a vertical transverse section taken on the line A—B of the drawings in the direction of the arrow points, and, Figure 4 is a slightly enlarged view taken on the line C—D of Figure 1 in the direction of the arrow points, as shown.

Referring now more particularly to the accompanying drawings wherein like corresponding parts are designated by similar reference characters throughout the several views, I have herein illustrated a film box consisting of a bottom wall $d$ having struck therefrom suitable trunnions or bearings indicated by the numeral 1 upon which may be rotatably mounted the film bobbins or spools. This box or casing is preferably made from sheet metal, having formed with the bottom $d$ thereof a continuous side wall 2 and a portion of this side wall being cut away to form an opening 3 therein. The bottom $d$ of the box or casing is provided with an extension 4 and the opening 3 within the side wall 2 of the casing is of greater length than the extension 4 as is illustrated in Figure 2 of the drawings. Formed with and extending at right angles to this extension 4 is a wall $b$ which is arranged parallel to and opposite a portion of the wall 2 of the casing, but of the same width as that of the side wall 2 of the casing.

The box is also provided with a cover indicated by the letter $k$ and this cover is also preferably made from sheet metal having a flange 5 which is adapted, when the cover is placed upon the box, to extend over the outer faces of the wall 2 of the casing in the manner as is better illustrated in Figures 3 and 4 of the drawings. This cover is also provided with an extension 6 of the same width as the extension 4 formed with the bottom $d$ of the casing and this extension 6 is provided with a flange 7 which is adapted to extend over the wall $b$ in the manner as is illustrated in Figure 4 of the drawings. Struck from the cover $k$ is a rib or beading 8, which beading is relatively wide at the points 9 wherein it contacts with the inner face of the wall 2 of the box forming a recess 10 between this beading and the flange 10 for receiving the outer edge of the wall 2. A portion of the bead or rib 8 is reduced in width as is indicated by the numeral 11 in order to produce a relatively wide recess 12 for a purpose which will be hereinafter more fully described. Struck inwardly from the extension 6 of the cover at the points indicated by the letters $l$ and $l'$ are the lugs 13 which are adapted to engage the inner face of the wall $b$ when the cover is placed upon the casing. The casing is preferably formed with two compartments one of which is adapted to retain a spool of unexposed film indicated by the numeral 14, whereas the other compartment is to contain a spool 15 upon which is to be wound the exposed film. The film is indicated by the letter $f$ in Figure 2 of the drawings and is provided with an exposed portion 16 which is arranged exteriorly of the casing in order that the operator may thread the same to the feed mechanism of the camera, in a manner which is common and well known in this art.

Mounted within each compartment of the casing are the sheet metal slides $e$ and $e'$ which are adapted to extend across the opening 3 of the side wall 2 in the manner as is better illustrated in the Figures 2 and 4 of the drawings. When the cover is removed from the casing these sheet metal slides $e$ and $e'$ may be moved within the respective compartments of the casing whereby the film may be easily and readily removed or placed within the casing, but when the cover is applied to the casing or box, each of the slides $e$ and $e'$ are seated within the recesses 12 of the cover, but are free to move within these recesses 12 so that the film strip may readily pass between the sheet metal shutters or slides. When these metal shutters are retained in position by the cover in the manner as is illustrated in Figure 2, they form between their adjacent ends an opening $g$ through which may pass the film strip in the manner as is also indicated in Figure 2 of the drawings. In order to prevent the rays of light from entering the box through this opening $g$ a small piece of felt indicated by the letter $h$ is placed therein and this felt is retained in position by a ledge or projection $i$ formed with the wall $d$. This strip or ribbon of felt is bent to form a V in cross section so that the outer or free end of the ledge $i$ fits within the apex of this V thereby forming two flexible wings which normally press outwardly against the outer faces $m$ and $m'$ of the sheet metal slides $e$ and $e'$. As the film strip passes between the outer faces of these sheet metal shutters $e$ and $e'$ and this strip of felt $h$, the flexible wings or ends of the latter will prevent any rays of light from entering the opening $g$ into the casing.

The extensions 4 and 6 formed with the casing and its cover as well as the wall $d$ provide two relatively long passageways $a$ and $a'$ through which pass the film strip and as the outer ends of these passageways are quite remote from the opening $g$ rays of light will be prevented from entering this opening, which latter is further safeguarded by the film strip $h$.

From the foregoing, it is obvious that I have provided a comparatively inexpensive film box in that it may be made or stamped from sheet metal and one which will protect the film contained therein by preventing any rays of light from striking the exposed or unexposed film contained therein. In the use of this film box the unexposed film is placed therein by the manufacturer or producer of the film and shipped to the consumer whereupon the consumer may place this film box with the film contained therein into his camera and after the film has been exposed the box may be withdrawn from the camera and returned to the manufacturer or others who will develop the exposed film whereby in the handling of said film, it will, at all times, be prevented from exposure and thereby providing a film box which may be loaded in the camera during daylight.

The elongated light-proof passageways $a$ and $a'$ provide for the egress and ingress of the film to the film opening $g$ of the film box, whereas the sheet metal slides $e$ and $e'$ project within the passageways in order to form relatively narrow channels whereby any direct rays of light which may enter the outer end of these passageways $a$ and $a'$ will be prevented from being reflected through the film opening $g$ into the box. This film opening $g$ of the box is further protected by means of the dark plush $h$ which permits of the smooth unwinding and rewinding of the film and owing to its flexible nature, presses against the film in such a manner to absolutely prevent any rays of light from passing around the film through the opening $g$ into the film compartments of the box. The operator, in placing this film box within the camera threads the extended portion 16 of the film through the feed mechanism of the camera and during the operation of the camera this film is unwound from the spool 14 and re-wound upon the spool 15. After the entire strip or roll of film has been exposed the operator removes the box from the camera and forwards the same to a dark room where the film may be removed from the box and developed. In the use of such a film box, it is obvious that the camera may be loaded or unloaded during the daylight and it is unnecessary for the operator at any time to remove the cover or film from the box or otherwise endanger the exposure of the film during the handling of the same.

Manifestly, the construction shown is capable of considerable modification, and such modification as is within the scope of our claims, we consider within the spirit of our invention.

We claim:—

1. A film box comprising a casing having compartments therein for receiving exposed and unexposed films, an extension formed with said casing, said casing having a film opening therein communicating with said extension, a ledge arranged within said extension for dividing the same into oppositely extended elongated passageways whereby the film passing through said opening may travel to and from said casing, and a light-proof shutter arranged within said passageways.

2. A film box comprising a casing consisting of a bottom wall and a side wall forming chambers therein for receiving a strip of film, said side wall being cut away to form a film opening, an extension formed with said bottom wall and extending about said opening, sheet metal slides arranged within said casing and projecting within said extension in order to form relatively narrow film passageways, a cover for said casing, and said cover adapted to extend over said extension whereby to retain said slides within the film opening.

3. A film box comprising a casing consisting of a bottom wall and a side wall, said side wall being cut away to form a film opening whereby a spool of film may be fed into and out of said casing through said opening, an extension formed with the bottom wall of the casing, a ledge carried by said extension for dividing the same into elongated passageways, sheet metal slides arranged within said casing and projecting within said passageways, a flexible shutter retained by said ledge within the film opening and normally engaging said sheet metal slides, a cover for said casing and means formed with said cover for retaining said sheet metal slides within said film opening substantially as and for the purposes specified.

4. A film box comprising a casing having compartments therein for receiving an exposed or unexposed film, a portion of one side of the casing being cut away to form a film opening, an extension wall formed on that side of the casing having the film opening therein, said wall substantially paralleling the opposite side of the casing and defining film passageways in communication with the film opening and terminating at the opposite end portions of said extension wall, and a flexible light-proof shutter arranged within said passageways.

EMANUEL GOLDBERG.
OTTO FISCHER.